US012607799B2

(12) United States Patent
Mukasa

(10) Patent No.: US 12,607,799 B2
(45) Date of Patent: Apr. 21, 2026

(54) OPTICAL FIBER

(71) Applicant: FURUKAWA ELECTRIC CO., LTD.,
Tokyo (JP)

(72) Inventor: Kazunori Mukasa, Tokyo (JP)

(73) Assignee: FURUKAWA ELECTRIC CO., LTD.,
Tokyo (JP)

( * ) Notice: Subject to any disclaimer, the term of this
patent is extended or adjusted under 35
U.S.C. 154(b) by 402 days.

(21) Appl. No.: 18/295,541

(22) Filed: Apr. 4, 2023

(65) Prior Publication Data

US 2023/0244027 A1 Aug. 3, 2023

Related U.S. Application Data

(63) Continuation of application No.
PCT/JP2021/035548, filed on Sep. 28, 2021.

(30) Foreign Application Priority Data

Oct. 6, 2020 (JP) .................................. 2020-168887

(51) Int. Cl.
*G02B 6/028* (2006.01)
*G02B 6/02* (2006.01)
*G02B 6/036* (2006.01)

(52) U.S. Cl.
CPC ......... *G02B 6/028* (2013.01); *G02B 6/02395*
(2013.01); *G02B 6/036* (2013.01); *G02B*
*6/03627* (2013.01)

(58) Field of Classification Search
CPC .... G02B 6/02395; G02B 6/028; G02B 6/036;
G02B 6/03627; G02B 6/03644; G02B
6/03655; G02B 6/03638
See application file for complete search history.

(56) References Cited

U.S. PATENT DOCUMENTS 9,291,771 B2 3/2016 Kawaguchi et al.
10,578,796 B2 3/2020 Nagasu et al.
(Continued)

FOREIGN PATENT DOCUMENTS

JP 2003-66259 A 3/2003
JP 2005-202440 A 7/2005
(Continued)

OTHER PUBLICATIONS

International Search Report issued Dec. 21, 2021 in PCT/JP2021/
035548 filed on Sep. 28, 2021, 2 pages.

*Primary Examiner* — Uyen Chau N Le
*Assistant Examiner* — Darby M. Thomason
(74) *Attorney, Agent, or Firm* — Oblon, McClelland,
Maier & Neustadt, L.L.P.

(57) ABSTRACT

An optical fiber includes: a core portion; a side core layer surrounding a circumference of the core portion; and a cladding portion surrounding a circumference of the side core layer. Relations, $\Delta 1 > \Delta Clad > \Delta 2$ and $0 > \Delta 2$, hold, where $\Delta 1$ denotes an average maximum relative refractive-index difference of the core portion with respect to an average refractive index of the cladding portion, $\Delta 2$ denotes a relative refractive-index difference of an average refractive index of the side core layer with respect to the average relative refractive index of the cladding portion, and $\Delta Clad$ denotes a relative refractive-index difference of the average refractive index of the cladding portion with respect to pure quartz glass, $\Delta 1$ is 0.24% or more and 0.30% or less, $\Delta 2$ is −0.27% or more and −0.08% or less, $(\Delta 1 - \Delta 2)$ is 0.36% or more and 0.57% or less.

7 Claims, 5 Drawing Sheets

(56) References Cited

U.S. PATENT DOCUMENTS

| | | | | |
|---|---|---|---|---|
| 2001/0017967 A1* | 8/2001 | Hirano | ................. | G02B 6/0228 |
| | | | | 385/123 |
| 2004/0109656 A1* | 6/2004 | Aikawa | ............. | G02B 6/02261 |
| | | | | 385/127 |
| 2004/0146261 A1 | 7/2004 | Zhang et al. | | |
| 2009/0123122 A1 | 5/2009 | Mukasa | | |
| 2012/0141078 A1 | 6/2012 | Mukasa et al. | | |
| 2017/0075060 A1 | 3/2017 | Kawaguchi et al. | | |

FOREIGN PATENT DOCUMENTS

| | | |
|---|---|---|
| JP | 2009-122277 A | 6/2009 |
| JP | 2012-37621 A | 2/2012 |
| JP | 2016-12123 A | 1/2016 |
| JP | 6500451 B2 | 4/2019 |
| JP | 6527973 B2 | 6/2019 |

* cited by examiner

OPTICAL FIBER

This application is a continuation of International Application No. PCT/JP2021/035548, filed on Sep. 28, 2021 which claims the benefit of priority of the prior Japanese Patent Application No. 2020-168887, filed on Oct. 6, 2020, the entire contents of which are incorporated herein by reference.

BACKGROUND

The present disclosure relates to optical fibers.

BACKGROUND

Optical fibers having W-shaped refractive index profiles adopted therein have been studied extensively (see Japanese Patent No. 6500451, Japanese Patent No. 6527973, Japanese Unexamined Patent Application, Publication No. 2003-66259 and Japanese Unexamined Patent Application, Publication No. 2009-122277). W-shaped refractive index profiles are adopted for, for example, enlargement of effective core areas of optical fibers. Optical fibers having large effective core areas may be suitably used as, for example, long-distance optical transmission lines, because the non-linear optical effect is less caused in these optical fibers. An effective core area may be referred to as Aeff.

SUMMARY

In general, there is a tradeoff between an effective core area and a cutoff wavelength, and when enlargement of the effective core area is attempted, the cutoff wavelength thus tends to become longer. However, to achieve single-mode transmission in a wavelength band used for optical transmission, decreasing the cutoff wavelength of the optical fiber may sometimes be demanded. Therefore, achieving both enlargement of the effective core area and decrease of the cutoff wavelength has had room for study. Furthermore, an optical fiber is generally used practically by being laid in a state of being housed in an optical cable, and in this state of being housed in the optical cable, the optical fiber is in a state where at least part of the optical fiber has been bent and the bending loss characteristic of the optical fiber thus needs to be considered also.

There is a need for an optical fiber having an enlarged effective core area as well as a short cutoff wavelength and a small bending loss.

According to one aspect of the present disclosure, there is provided an optical fiber including: a core portion; a side core layer surrounding a circumference of the core portion; and a cladding portion surrounding a circumference of the side core layer, wherein relations, $\Delta 1 > \Delta Clad > \Delta 2$ and $0 > \Delta 2$, hold, where $\Delta 1$ denotes an average maximum relative refractive-index difference of the core portion with respect to an average refractive index of the cladding portion, $\Delta 2$ denotes a relative refractive-index difference of an average refractive index of the side core layer with respect to the average relative refractive index of the cladding portion, and $\Delta Clad$ denotes a relative refractive-index difference of the average refractive index of the cladding portion with respect to pure quartz glass, $\Delta 1$ is 0.24% or more and 0.30% or less, $\Delta 2$ is −0.27% or more and −0.08% or less, ($\Delta 1 − \Delta 2$) is 0.36% or more and 0.57% or less, b/a is 2 or larger where a core diameter of the core portion is 2a and an outer diameter of the side core layer is 2b, and the optical fiber has an effective core area of 107 $\mu m^2$ and larger and 130 $\mu m^2$ or smaller, at a wavelength of 1550 nm.

BRIEF DESCRIPTION OF THE DRAWINGS

FIG. 9 is a diagram illustrating an example of relations between effective core areas and bending losses in cases of some values of b/a.

DETAILED DESCRIPTION

An embodiment of the present disclosure will be described in detail hereinafter while reference is made to the appended drawings. The present disclosure is not limited by the embodiment described hereinafter. Furthermore, throughout the drawings, any components that are the same or corresponding to each other will be assigned with the same reference sign, as appropriate. In addition, a cutoff wavelength or an effective cutoff wavelength in this specification refers to a cable cutoff wavelength defined by ITU-T G.650.1 of International Telecommunication Union (ITU). Furthermore, any other term not particularly defined in this specification conforms to the definition or measurement method according to G.650.1 and G.650.2.

Figure 1:
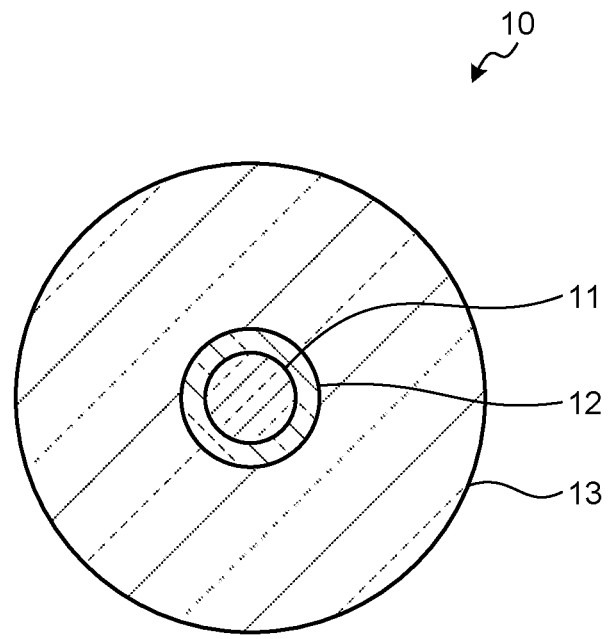
FIG. 1 is a schematic sectional view of an optical fiber according to an embodiment.

FIG. 1 is a schematic sectional view of an optical fiber according to an embodiment. An optical fiber 10 is made of silica-based glass and includes a core portion 11, a side core layer 12 surrounding the circumference of the core portion 11, and a cladding portion 13 surrounding the circumference of the side core layer 12. The optical fiber 10 may include a covering layer surrounding the circumference of the cladding portion 13.

Figure 2:
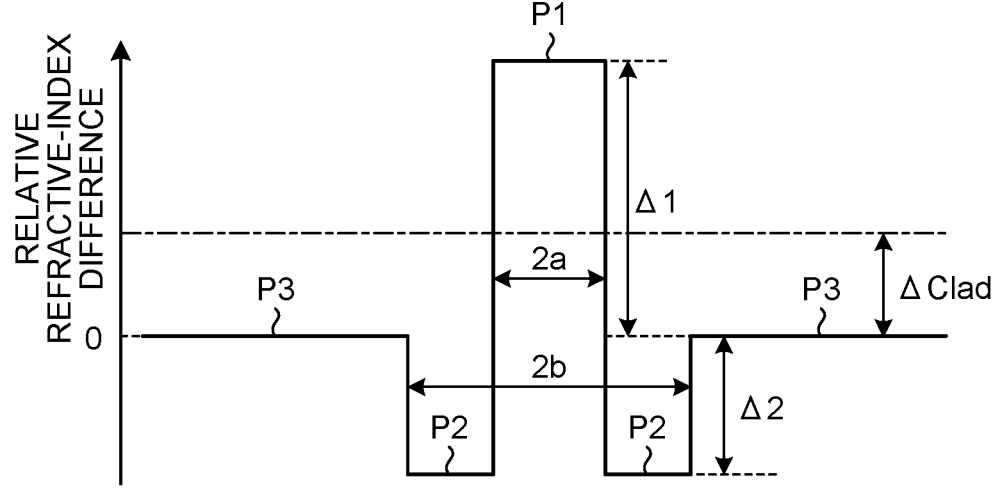
FIG. 2 is a schematic diagram of a refractive index profile of the optical fiber according to the embodiment.

FIG. 2 is a diagram illustrating a refractive index profile of the optical fiber 10. A profile P1 is a refractive index profile of the core portion 11 and has a so-called step shape. A profile P2 is a refractive index profile of the side core layer 12. A profile P3 is a refractive index profile of the cladding portion 13.

The refractive index profile of the core portion 11 is not limited to the step shape that is a geometrically ideal shape, and the top portion of the refractive index profile of the core portion 11 may have irregularities formed thereon due to manufacturing characteristics, without being shaped flatly, or the refractive index profile of the core portion 11 may be shaped to trail off from the top portion. In this case, the refractive index of an approximately flat region of the top portion of the refractive index profile serves as an indicator for determining Δ1, the approximately flat region being in the range of a core diameter 2a of the core portion 11, the core diameter 2a being according to the manufacturing design.

The following description is on structural parameters of the optical fiber 10. As mentioned above, the core diameter of the core portion 11 is 2a. Furthermore, the side core layer 12 has an outer diameter of 2b.

Furthermore, the relative refractive-index difference (the maximum relative refractive-index difference) of the average maximum refractive index of the core portion 11 with respect to the average refractive index of the cladding portion 13 is Δ1. The relative refractive-index difference of the average refractive index of the side core layer 12 with respect to the average refractive index of the cladding portion 13 is Δ2. The average maximum refractive index of the core portion 11 is the average value, in a radial direction, of refractive indices in the approximately flat region of the top portion of the refractive index profile. The average refractive indices of the side core layer 12 and the cladding portion 13 are average values of refractive indices in the radial direction of the refractive index profile.

Furthermore, the relative refractive-index difference of the average refractive index of the cladding portion 13 with respect to the refractive index of pure quartz glass is ΔClad. Pure quartz glass herein refers to extremely pure quartz glass having a refractive index of about 1.444 at a wavelength of 1550 nm and substantially not including a dopant that changes its refractive index. FIG. 2 illustrates the relative refractive-index difference of pure quartz glass with respect to the average refractive index of the cladding portion 13, by means of a dashed-and-dotted line.

Relations, Δ1>ΔClad>Δ2 and 0>Δ2, hold for Δ1, Δ2, and ΔClad. That is, the optical fiber 10 has a W-shaped refractive index profile. Furthermore, FIG. 2 and part of Table 1 represent cases where ΔClad is less than 0%, but ΔClad may be 0% or more.

The following description is on materials that the optical fiber 10 is made of. The core portion 11 is made of silica-based glass including a dopant for refractive index adjustment that increases its refractive index. For example, the core portion 11 includes, as a dopant or dopants, at least one, for example, two or more, of: germanium (Ge); chlorine (Cl); fluorine (F); potassium (K); and sodium (Na). F lowers the refractive index of quartz glass, and (Ge), Cl, K, and Na are dopants that increase the refractive index of quartz glass.

The side core layer 12 and the cladding portion 13, on the other hand, are made of silica-based glass having only F and Cl added therein. By adjustment of the refractive indices through these dopants, the relations, Δ1>ΔClad>Δ2 and 0>Δ2, hold, and preferred ranges of Δ1, Δ2, and ΔClad described later are also achieved.

As for the structural parameters of the optical fiber 10 according to the embodiment, Δ1 is 0.24% or more and 0.30% or less, Δ2 is −0.27% or more and −0.08% or less, (Δ1−Δ2) is 0.36% or more and 0.57% or less, and b/a is 2 or larger. Furthermore, the structural parameters for the optical fiber 10 are set to achieve a characteristic that the effective core area at the wavelength of 1550 nm is 107 μm² or larger and 130 μm² or smaller.

Short cutoff wavelength and small bending loss characteristics of the optical fiber 10 are thereby achieved with its effective core area enlarged to about 107 μm² or larger and 130 μm² or smaller. For example, the optical fiber 10 has a cable cutoff wavelength of 1530 nm or shorter, and a bending loss of 1 dB/m or smaller at the wavelength of 1550 nm upon bending of the optical fiber 10 at a diameter of 30 mm.

The bending loss at the wavelength of 1550 nm upon the bending at the diameter of 30 mm may hereinafter be simply referred to as the bending loss. Furthermore, such a bending loss may be referred to as a macro bending loss and the condition where the optical fiber 10 is bent at the diameter of 30 mm may be additionally written as "30 mm".

The optical fiber 10 is capable of achieving an even lower cutoff wavelength characteristic with a cable cutoff wavelength of 1460 nm or shorter. For example, when the optical fiber 10 has a cable cutoff wavelength of 1530 nm or shorter, single-mode transmission is enabled in optical transmission wavelength bands of the C band (for example, 1530 nm to 1565 nm) and the L band (for example, 1565 nm to 1625 nm). When the optical fiber 10 has a cable cutoff wavelength of 1460 nm or shorter, single-mode transmission is enabled further in the S band (for example, 1460 nm to 1530 nm) also, in addition to the C band and L band, and single-mode transmission is thus enabled over an extremely wide band.

The optical fiber 10 is also capable of achieving an even lower bending loss characteristic with a bending loss of 0.5 dB/m. According to diligent study conducted by the inventor, when the bending loss is 1 dB/m or smaller, even if the optical fiber 10 is housed in an optical cable for practical use, increase in transmission loss due to the bending that occurs when the optical fiber 10 is housed in the optical cable is reduced. Furthermore, when the bending loss is 0.5 dB/m or less, the increase in transmission loss in the state where the optical fiber 10 has been housed in the optical cable is reduced even more.

Preferred Combinations of Structural Parameters and Characteristics

The following description is on the inventor's diligent study for finding out the preferred combinations of the structural parameters for the optical fiber 10 and the preferred characteristics obtained thereby, which have been described above.

Firstly, simulation calculation was performed for values of the effective core area and cable cutoff wavelength, in relation to various values of Δ1. The other structural parameters, Δ2, 2a, and b/a, were set to cover various combinations.

Figure 3:
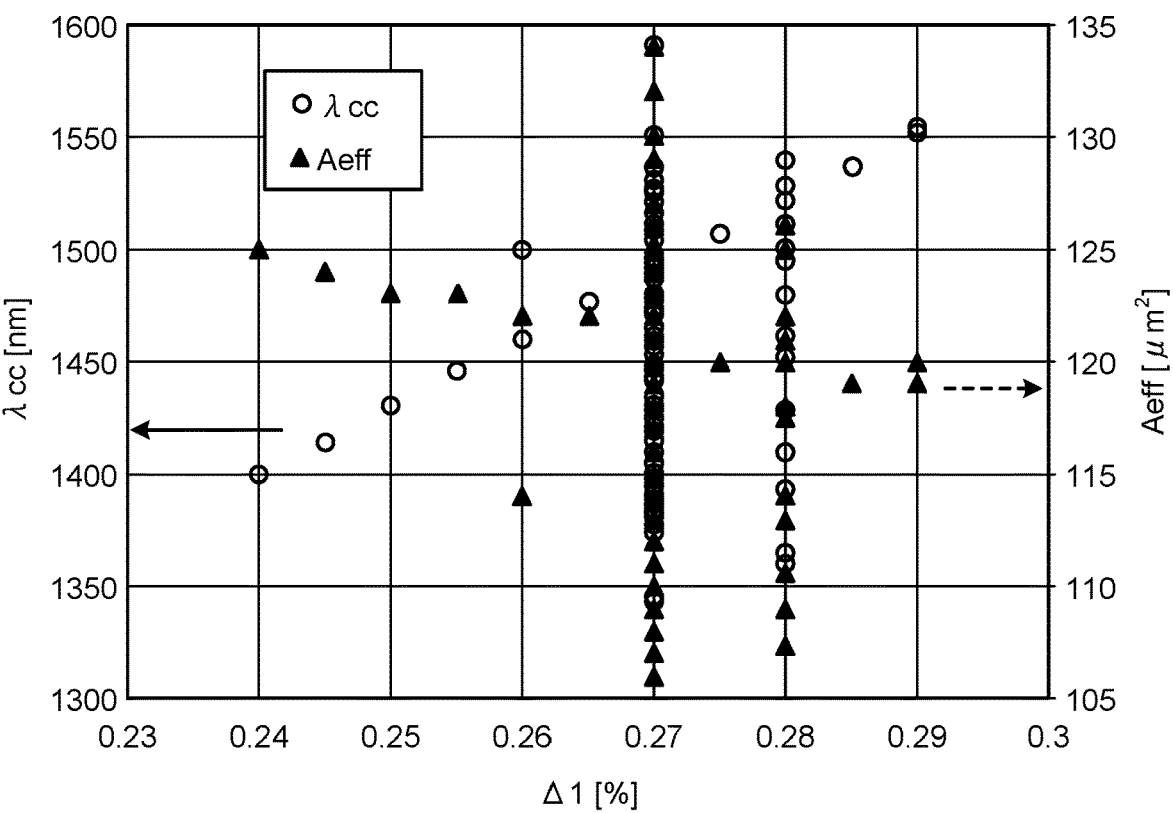
FIG. 3 is a diagram illustrating an example of relations between: $\Delta 1$; and cutoff wavelengths and effective core areas.

FIG. 3 is a diagram illustrating an example of relations between: Δ1; and cutoff wavelengths and effective core areas. The horizontal axis represents Δ1 and the vertical axes represent the cutoff wavelength (λcc) and the effective core area (Aeff) at the wavelength of 1550 nm. As illustrated in FIG. 3, data points for a certain same value of Δ1 correspond to mutually different combinations of the structural parameters and λcc and Aeff thus have various values. In particular, the number of calculations is the largest in FIG. 3 for combinations of the structural parameters in which Δ1 is 0.27%, and various values are thus plotted therefor. However, it may be confirmed that the larger the value of Δ1 is, the larger the value of acc and the smaller the value of Aeff tend to be.

The inventor has confirmed, from FIG. 3, that Δ1 is desirably 0.3% or less, to satisfy, with a margin to spare, λcc of 1530 nm or shorter and Aeff of 107 μm² or larger, or to obtain a certain number or more of or a certain proportion or more of data points satisfying λcc of 1530 nm or shorter and Aeff of 107 μm² or larger.

Figure 4:
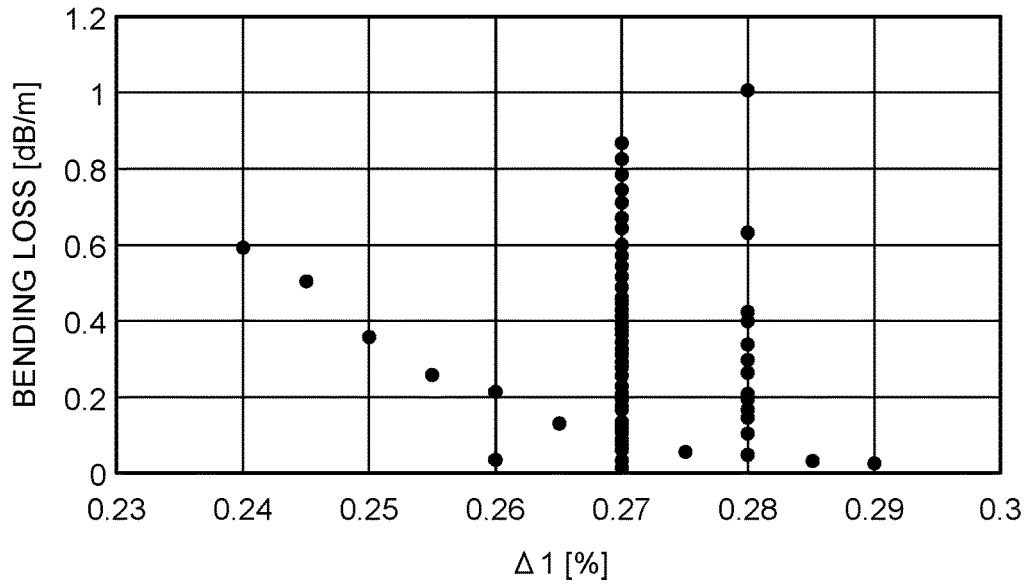
FIG. 4 is a diagram illustrating an example of a relation between $\Delta 1$ and bending losses.

FIG. 4 is a diagram illustrating an example of a relation between Δ1 and bending losses. Similarly to FIG. 3, as illustrated in FIG. 4, for a certain value of Δ1 also, data points correspond to mutually different combinations of the structural parameters, and the bending loss thus has various values. However, it may be confirmed that the larger the value of $\Delta 1$ is, the smaller the bending loss tends to be.

The inventor has confirmed, from FIG. 4, that $\Delta 1$ is desirably 0.24% or more, to satisfy, with a margin to spare, a bending loss of 1 dB/m or smaller, or to obtain a certain number or more of or a certain proportion or more of data points satisfying the bending loss of 1 dB/m or smaller. Therefore, from FIG. 3 and FIG. 4, $\Delta 1$ is desirably 0.24% or more and 0.3% or less.

Subsequently, as a result of the simulation calculation, the inventor focused on $(\Delta 1-\Delta 2)$ as a structural parameter that influences Aeff and bending loss, aside from L1. Therefore, the inventor performed simulation calculation for values of Aeff and bending loss, in relation to various values of $(\Delta 1-\Delta 2)$. In the simulation calculation, $\Delta 1$ was set at various values in the range of 0.24% or more and 0.3% or less. Furthermore, the other structural parameters, 2a and b/a, were set to cover various combinations.

Figure 5:
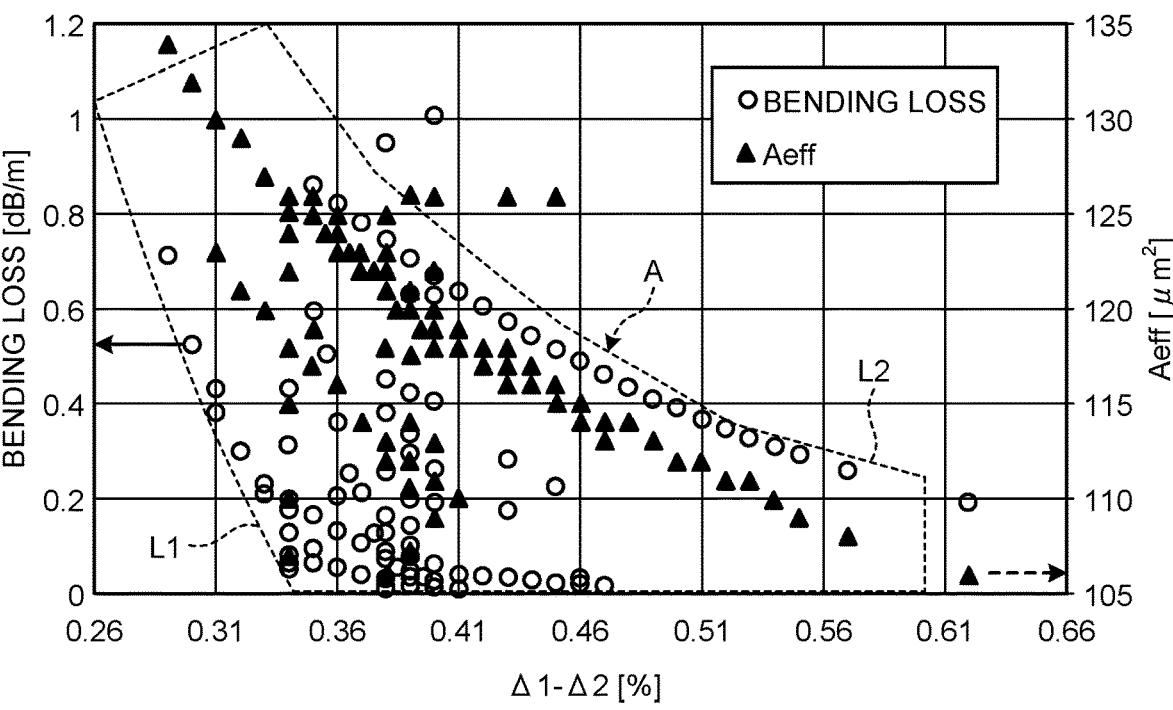
FIG. 5 is a diagram illustrating an example of relations between: ($\Delta 1 − \Delta 2$); and bending losses and effective core areas.

FIG. 5 is a diagram illustrating an example of relations between: $(\Delta 1-\Delta 2)$; and bending losses and effective core areas. A region A surrounded by a dashed line including dashed lines L1 and L2 represents a certain trend of data points. It may be confirmed, from FIG. 5, that $(\Delta 1-\Delta 2)$ is correlated to the bending loss and Aeff, and the larger the value of $(\Delta 1-\Delta 2)$ is, the smaller the bending loss and Aeff tend to be.

Figure 6:
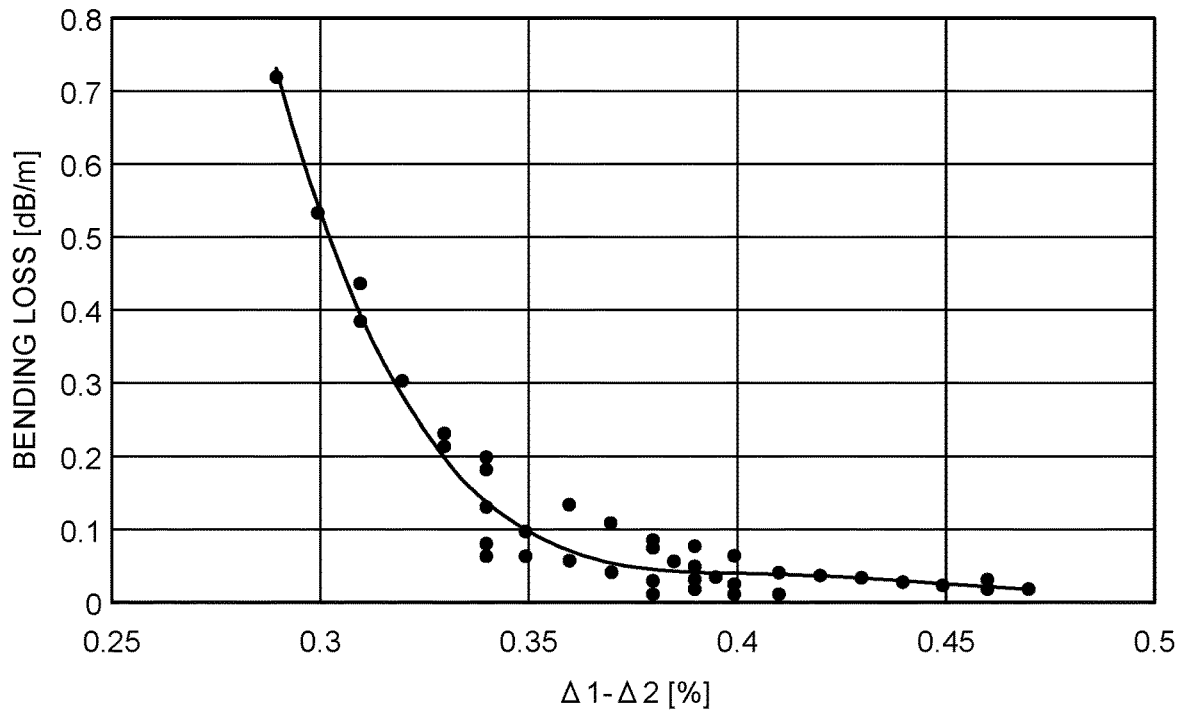
FIG. 6 is a diagram illustrating an example of a fitting function for data points of bending loss in FIG. 5.

Specifically, as $(\Delta 1-\Delta 2)$ became smaller than 0.36%, the bending loss increased sharply. FIG. 6 is a diagram illustrating an example of a fitting function found by the least squares method for data points present along the dashed line L1 and smaller in bending loss, the data points being of the data points for bending loss in FIG. 5. The fitting function is a quartic function of $(\Delta 1-\Delta 2)$ and specifically was "$y=2126.5x^4-3638.2x^3+2328.4x^2-660.83x+70.245$", but it may be learned that as $(\Delta 1-\Delta 2)$ becomes less than 0.36%, the bending loss increases sharply. From this result, in consideration of stable manufacture also, $(\Delta 1-\Delta 2)$ is desirably 0.36% or more.

Furthermore, as for Aeff, when $(\Delta 1-\Delta 2)$ exceeds 0.57%, Aeff of 107 $\mu m^2$ or larger becomes difficult to be achieved. Therefore, $(\Delta 1-\Delta 2)$ is desirably 0.36% or more and 0.57% or less.

Subsequently, the inventor performed simulation calculation for values of Aeff and $\lambda cc$, in relation to various values of $\Delta 2$. In this simulation calculation, $\Delta 1$ was set at various values in the range of 0.24% or more and 0.3% or less, and $(\Delta 1-\Delta 2)$ was set at various values in a range of 0.32% or more and 0.57% or less. Furthermore, the other structural parameters, 2a and b/a, were set to cover various combinations.

Figure 7:
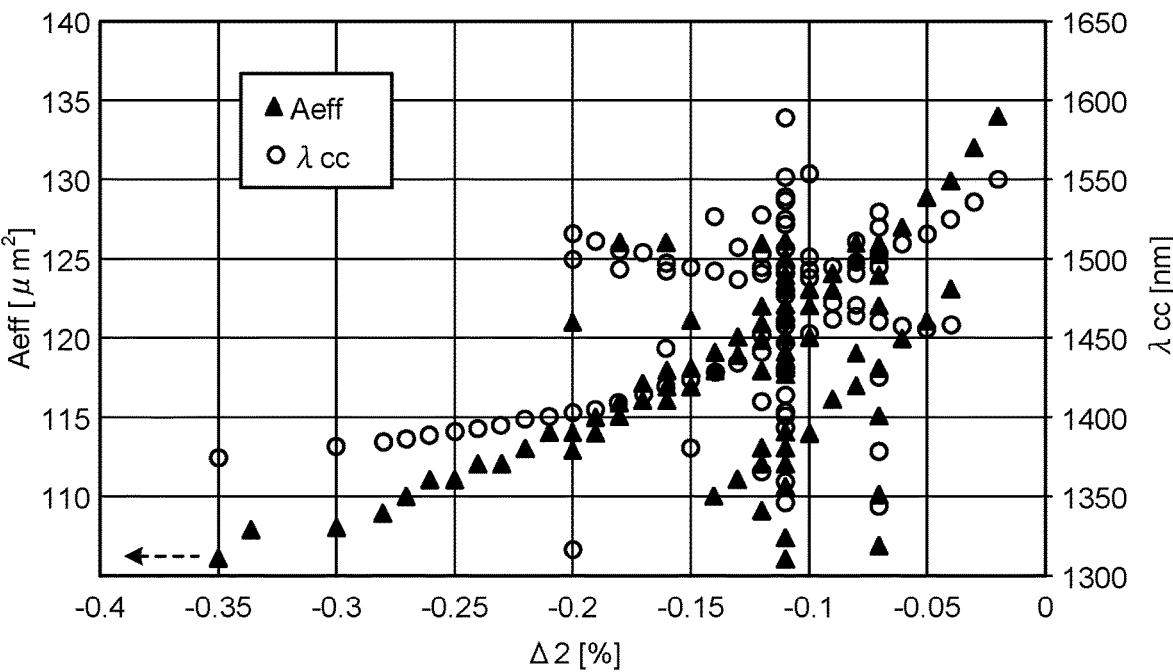
FIG. 7 is a diagram illustrating an example of relations between: $\Delta 2$; and cutoff wavelengths and effective core areas.

FIG. 7 is a diagram illustrating an example of relations between: $\Delta 2$; and cutoff wavelengths and effective core areas. From FIG. 7, it may be confirmed that the larger the value of $\Delta 2$ is, the smaller $\lambda cc$ and Aeff tend to be.

The inventor has confirmed, from FIG. 7, that $\Delta 2$ is desirably -0.27% or more and -0.08% or less to satisfy, with a margin to spare, $\lambda cc$ of 1530 nm or shorter and Aeff of 107 $\mu m^2$ or larger, or to obtain a certain number or more of or a certain proportion or more of data points satisfying $\lambda cc$ of 1530 nm or shorter and Aeff of 107 $\mu m^2$ or larger.

From the above results of exhaustive simulation calculation, as for the structural parameters of the optical fiber 10 according to the embodiment, it was confirmed that desirably, $\Delta 1$ is 0.24% or more and 0.30% or less, $\Delta 2$ is -0.27% or more and -0.08% or less, and $(\Delta 1-\Delta 2)$ is 0.36% or more and 0.57% or less.

Figure 8:
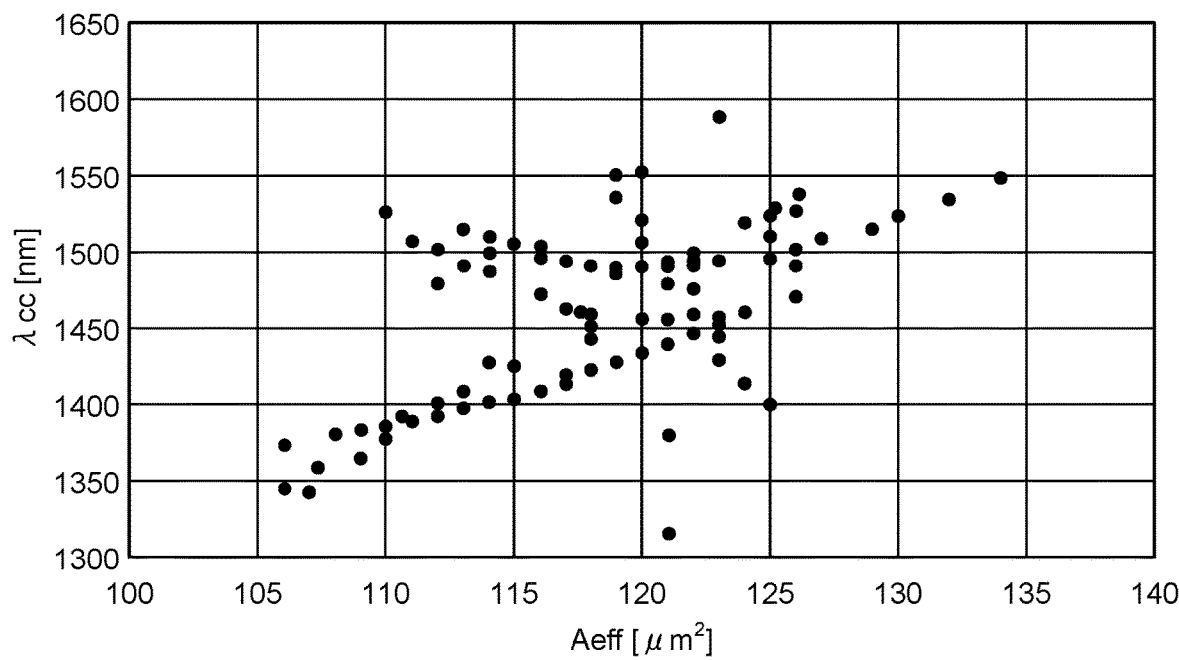
FIG. 8 is a diagram illustrating an example of a relation between effective core areas and cutoff wavelengths.

FIG. 8 is a diagram illustrating an example of a relation between effective core areas and cutoff wavelengths that are both obtained as results of the above described desired combinations of $\Delta 1$, $\Delta 2$, and $(\Delta 1-\Delta 2)$. According to FIG. 8, Aeff of 107 $\mu m^2$ or larger has been achieved. To further satisfy a condition where $\lambda cc$ is 1530 nm or shorter, Aeff is desirably 130 $\mu m^2$ or smaller. Furthermore, to satisfy a condition where $\lambda cc$ is 1460 nm or shorter, Aeff is desirably 125 $\mu m^2$ or smaller.

Furthermore, the inventor studied optimization of the structural parameter, b/a. Firstly, various values of b/a were set, the other structural parameters were set next so that the relation between Aeff and $\lambda cc$ became constant at these values of b/a, and the relation between Aeff and bending loss was then investigated.

Figure 9:
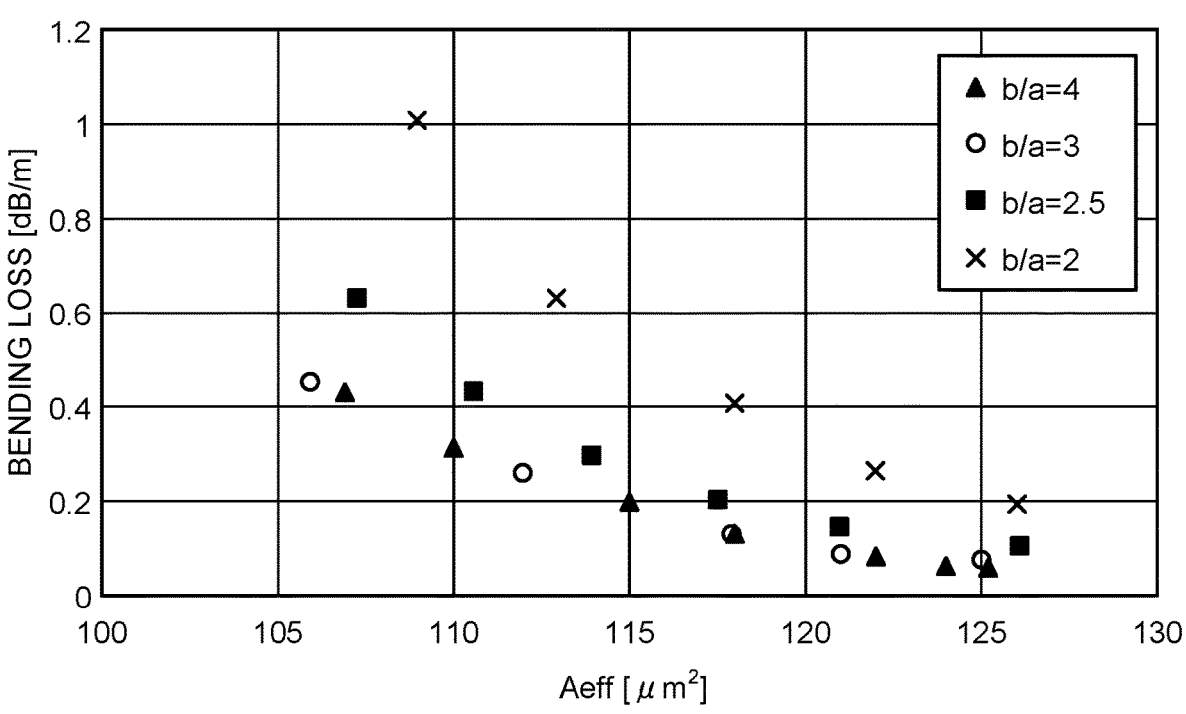

FIG. 9 is a diagram illustrating an example of relations between effective core areas and bending losses in cases of some values of b/a. In FIG. 9, b/a was set at 2, 2.5, 3, and 4. According to FIG. 9, when b/a is smaller than 3, the bending loss is large, and when b/a is smaller than 2, the bending loss may exceed 1 dB/m. Therefore, b/a is desirably 2 or larger. Furthermore, when b/a is made larger than 3, for example, when b/a is 4, the bending loss is almost not reduced further. Therefore, in terms of bending loss, b/a of about 3 is sufficient. As a result of the above study, b/a is, for example, 2 or larger and 6 or smaller, and b/a is more preferably 2.5 or larger and 4 or smaller.

Lastly, the core diameter 2a may be set as appropriate so that desired characteristics are achieved for Aeff, $\lambda cc$, and bending loss, after selecting values of $\Delta 1$, $\Delta 2$, $(\Delta 1-\Delta 2)$, and b/a from the above described desired ranges.

As described above, the optical fiber 10 according to the embodiment has a low cutoff wavelength and low bending loss while having an enlarged effective core area.

The optical fiber 10 according to the embodiment may be manufactured easily by: manufacturing an optical fiber preform by a known method using, for example, the vapor axial deposition (VAD) method, the outside vapor deposition (OVD) method, the modified chemical vapor deposition (MCVD) method, or the plasma CVD method; and drawing the optical fiber 10 from this optical fiber preform.

For example, a dopant, such as Ge, F, K, or Na, may be added in the optical fiber preform by use of gas including the dopant when soot is synthesized. Furthermore, Cl may be added to the optical fiber preform by causing chlorine gas to remain, the chlorine gas being used in a dehydration process. In addition, F may be added to the optical fiber preform by causing fluorine gas to flow in a vitrification sintering process.

The average maximum relative refractive-index difference of the core portion 11 with respect to the refractive index of pure quartz glass is expressed by $(\Delta 1+\Delta Clad)$, but $(\Delta 1+\Delta Clad)$ is not necessarily a positive value. For example, the core portion 11 may be formed of pure quartz glass so that an equation, $(\Delta 1+\Delta Clad)=0$, holds, or a dopant that decreases the refractive index may be added to the core portion 11 so that a relation, $(\Delta 1+\Delta Clad)<0$, holds.

Furthermore, in a case where the refractive index of the side core layer 12 is achieved by addition of F, when $\Delta 2$ is too small, the difficulty of manufacture is increased and the transmission loss of the optical fiber 10 may thereby be increased. Accordingly, a dopant that increases the refractive index may be added to the core portion 11 to achieve a desired value of $(\Delta 1-\Delta 2)$ and prevent $\Delta 2$ from becoming too small. In this case, for example, the dopant is preferably added to the core portion 11 so that (Δ1+ΔClad) becomes 0.03% or more and 0.18% or less.

EXAMPLES

As examples, optical fibers having sample numbers 1 to 17 and W-shaped refractive index profiles were manufactured by drawing optical fiber preforms manufactured using the VAD method, and their optical characteristics were measured. Structural parameters of these samples are listed in Table 1 and their optical characteristics are listed in Table 2. Therein, "MFD" means a mode field diameter, and "slope" means a dispersion slope.

As a method of achieving the W-shaped refractive index profiles, the following method (1) or (2) was used. That is, in the method (1), the refractive index of a core portion is made higher than that of pure quartz glass by addition of Ge to the core portion, and the cladding portion is made of pure quartz glass or silica-based glass having a refractive index close to that of pure quartz glass. In the method (2), Cl or K, for example, is added to a core portion to an extent where the refractive index and Rayleigh scattering loss are not increased too much, to make the refractive index higher than that of pure quartz glass, and F is added to the cladding portion to make the refractive index lower than that of pure quartz glass. In Tables 1 and 2, sample numbers of samples for which the method (1) was used are written with a notation, "(Ge)", and samples numbers of samples for which the method (2) was used are written with a notation, "(Si)".

Furthermore, in Table 1, "Δ1+ΔClad" means the average maximum relative refractive-index difference of the core portion with respect to pure quartz glass. In addition, "Δ2+ΔClad" means the relative refractive-index difference of the average refractive index of the side core layer with respect to pure quartz glass. Furthermore, "Δ1" means the average maximum relative refractive-index difference of the core portion with respect to the average refractive index of the cladding portion. In addition, "Δ2" means the relative refractive-index difference of the average refractive index of the side core layer with respect to the average refractive index of the cladding portion. Of the optical characteristics listed in Table 2, "Δ1+ΔClad" and "Δ2+ΔClad", for example, mainly influence the transmission loss characteristics, and "Δ1" and "Δ2", for example, mainly influence the other optical characteristics.

The optical fibers having the sample numbers 1 to 17 all had a cladding diameter of 125 m. Furthermore, as listed in Table 1, the optical fibers having the sample numbers 1 to 17 all had Δ1 of 0.24% or more and 0.30% or less, Δ2 of −0.27% or more and −0.08% or less, (Δ1−Δ2) of 0.36% or more and 0.57% or less, ΔClad of −0.22% or more and 0.03% or less, and b/a of 2 or larger and 4 or smaller. In addition, they had a core diameter 2a of 124 μm or larger and 13.8 μm or smaller. As a result, as listed in Table 2, it was confirmed that the optical fibers having the sample numbers 1 to 17 all had satisfactory characteristics including Aeff of 107 μm² or larger and 130 μm² or smaller, λcc of 1386 nm or longer and 1530 nm or shorter or even 1460 nm or shorter, MFD of 11.2 μm or larger and 12.1 μm or smaller at the wavelength of 1550 nm, wavelength dispersion of 20.8 ps/nm/km or larger and 21.9 ps/nm/km or smaller at the wavelength of 1550 nm, a dispersion slope of 0.062 ps/nm²/km or larger and 0.063 ps/nm²/km or smaller at the wavelength of 1550 nm, and a bending loss of 1 dB/m or smaller or even 0.5 dB/m or smaller. Furthermore, it was confirmed that the samples made by the method (2), like the optical fibers having the sample numbers 1 to 3, 7 to 11, and 15 to 17, had (Δ1+ΔClad) of 0.03% or more, and thus had low transmission losses of 0.153 dB/km or larger and 0.188 dB/km or smaller, for example, 0.17 dB/km. In addition, it was confirmed that the MFDs, wavelength dispersion, and dispersion slopes satisfied the standards of ITU-T G.654, for example.

Furthermore, the sample number 8 had Δ1 of 0.27%, Δ2 of −0.11%, (Δ1−Δ2) of 0.38%, ΔClad of −0.2%, and b/a of 3. Furthermore, its core diameter 2a was 13.3 m. As a result, it was confirmed that the sample number 8 had satisfactory characteristics, Aeff of 121 μm², λcc of 1492 nm, MFD of 12 μm, wavelength dispersion of 21.1 ps/nm/km, a dispersion slope of 0.063 ps/nm²/km, a bending loss of 0.09 dB/m, and a transmission loss of 0.167 dB/km.

Furthermore, the sample number 11 had Δ1 of 0.25%, Δ2 of −0.11%, (Δ1−Δ2) of 0.36%, ΔClad of −0.1%, and b/a of 3. In addition, its core diameter 2a was 13.3 m. As a result, it was confirmed that the sample number 11 had satisfactory characteristics, Aeff of 123 μm², λcc of 1430 nm, MFD of 12.1 μm, wavelength dispersion of 21.1 ps/nm/km, a dispersion slope of 0.062 ps/nm²/km, a bending loss of 0.36 dB/m, and a transmission loss of 0.157 dB/km.

Furthermore, the sample No. 17 had Δ1 of 0.27%, Δ2 of −0.1%, (Δ1−Δ2) of 0.37%, ΔClad of −0.24%, and b/a of 4. In addition, its core diameter 2a was 12.5 μm. As a result, it was confirmed that the sample number 17 had satisfactory characteristics, Aeff of 114 μm², λcc of 1488 nm, MFD of 11.7 μm, wavelength dispersion of 20.9 ps/nm/km, a dispersion slope of 0.062 ps/nm²/km, a bending loss of 0.04 dB/m, and a transmission loss of 0.169 dB/km.

Furthermore, connection characteristics with respect to other optical fibers and cable characteristics (such as losses after formation into cables) were checked for the optical fibers having the sample numbers 1 to 17, and found to have no particular problems.

TABLE 1

| Sample No. | Δ1 + ΔClad % | Δ2 + ΔClad % | ΔClad % | Δ1 % | Δ2 % | Δ1-Δ2 % | b/a | 2a μm |
|---|---|---|---|---|---|---|---|---|
| 01(Si) | 0.18 | −0.38 | −0.11 | 0.29 | −0.27 | 0.56 | 2 | 13.3 |
| 02(Si) | 0.08 | −0.32 | −0.2 | 0.28 | −0.12 | 0.4 | 2 | 13.5 |
| 03(Si) | 0.09 | −0.31 | −0.19 | 0.28 | −0.12 | 0.4 | 2 | 13.8 |
| 04(Ge) | 0.28 | −0.12 | 0.03 | 0.25 | −0.15 | 0.4 | 2 | 13.1 |
| 05(Ge) | 0.30 | −0.08 | 0.03 | 0.27 | −0.11 | 0.38 | 2 | 13.3 |
| 06(Ge) | 0.28 | −0.11 | 0.03 | 0.25 | −0.14 | 0.39 | 2.5 | 13.3 |
| 07(Ge) | 0.28 | −0.11 | 0.03 | 0.25 | −0.14 | 0.39 | 2.5 | 13 |
| 08(Si) | 0.07 | −0.31 | −0.2 | 0.27 | −0.11 | 0.38 | 3 | 13.3 |
| 09(Si) | 0.09 | −0.29 | −0.18 | 0.27 | −0.11 | 0.38 | 3 | 13.6 |
| 10(Si) | 0.1 | −0.28 | −0.17 | 0.27 | −0.11 | 0.38 | 3 | 13 |
| 11(Si) | 0.15 | −0.21 | −0.1 | 0.25 | −0.11 | 0.36 | 3 | 13.3 |
| 12(Si) | 0.12 | −0.3 | −0.15 | 0.27 | −0.15 | 0.42 | 3 | 13.3 |
| 13(Ge) | 0.27 | −0.2 | 0.03 | 0.24 | −0.23 | 0.47 | 3 | 13.3 |
| 14(Ge) | 0.27 | −0.09 | 0.03 | 0.24 | −0.12 | 0.36 | 3 | 13.3 |
| 15(Ge) | 0.27 | −0.22 | 0.03 | 0.24 | −0.25 | 0.49 | 3 | 13.3 |
| 16(Si) | 0.07 | −0.33 | −0.22 | 0.29 | −0.11 | 0.4 | 4 | 12.4 |
| 17(Si) | 0.03 | −0.34 | −0.24 | 0.27 | −0.1 | 0.37 | 4 | 12.5 |
| 18(Si) | 0.05 | −0.31 | −0.22 | 0.27 | −0.09 | 0.36 | 4 | 12.5 |

TABLE 2

| Sample No. | MFD at 1550 nm μm | Aeff at 1550 nm μm² | λcc nm | Bending Loss (30 mm φ) at 1550 nm dB/m | Transmission loss at 1550 nm dB/km | Wavelength dispersion at 1550 nm ps/nm/km | Slope at 1550 nm ps/nm²/km |
|---|---|---|---|---|---|---|---|
| 01(Si) | 11.2 | 110 | 1386 | 0.31 | 0.17 | 21.9 | 0.063 |
| 02(Si) | 12 | 122 | 1495 | 0.26 | 0.167 | 21.2 | 0.063 |
| 03(Si) | 12.1 | 126 | 1528 | 0.19 | 0.169 | 21.3 | 0.063 |
| 04(Ge) | 11.8 | 118 | 1458 | 0.41 | 0.186 | 21.1 | 0.062 |
| 05(Ge) | 12 | 122 | 1447 | 0.75 | 0.185 | 21.1 | 0.062 |
| 06(Ge) | 12 | 121 | 1494 | 0.15 | 0.187 | 21.2 | 0.063 |
| 07(Ge) | 11.8 | 118 | 1461 | 0.2 | 0.188 | 21.1 | 0.062 |
| 08(Si) | 12 | 121 | 1492 | 0.09 | 0.167 | 21.1 | 0.063 |
| 09(Si) | 12.1 | 125 | 1525 | 0.08 | 0.166 | 21.2 | 0.063 |
| 10(Si) | 11.8 | 118 | 1458 | 0.13 | 0.168 | 21.1 | 0.062 |
| 11(Si) | 12.1 | 123 | 1430 | 0.36 | 0.157 | 21.1 | 0.062 |
| 12(Si) | 11.7 | 117 | 1495 | 0.04 | 0.153 | 21.4 | 0.063 |
| 13(Ge) | 11.5 | 113 | 1516 | 0.02 | 0.185 | 21.6 | 0.063 |
| 14(Ge) | 12.1 | 123 | 1495 | 0.13 | 0.187 | 21 | 0.063 |
| 15(Ge) | 11.4 | 113 | 1398 | 0.41 | 0.188 | 21.7 | 0.062 |
| 16(Si) | 11.6 | 112 | 1480 | 0.03 | 0.167 | 20.9 | 0.062 |
| 17(Si) | 11.7 | 114 | 1488 | 0.04 | 0.169 | 20.9 | 0.062 |
| 18(Si) | 11.8 | 116 | 1473 | 0.06 | 0.168 | 20.8 | 0.062 |

The present disclosure is not limited by the above described embodiment. Those configured by any combination of the components described above as appropriate are also included in the present disclosure. In addition, further effects and modifications may be easily derived by those skilled in the art. Therefore, wider aspects of the present disclosure are not limited to the above described embodiment, and various modifications are possible.

As described above, the present disclosure may be suitably used in optical fibers serving as long-distance transmission lines, for example.

The present disclosure has an effect of enabling an optical fiber to be provided, the optical fiber having an enlarged effective core area as well as a short cutoff wavelength and a small bending loss.

What is claimed is:

1. An optical fiber comprising:

a core portion;

a side core layer surrounding a circumference of the core portion; and a cladding portion surrounding a circumference of the side core layer, wherein relations, $\Delta 1 > \Delta Clad > \Delta 2$ and $0 > \Delta 2$, hold, where $\Delta 1$ denotes an average maximum relative refractive-index difference of the core portion with respect to an average refractive index of the cladding portion, $\Delta 2$ denotes a relative refractive-index difference of an average refractive index of the side core layer with respect to the average relative refractive index of the cladding portion, and $\Delta Clad$ denotes a relative refractive-index difference of the average refractive index of the cladding portion with respect to pure quartz glass, $\Delta 1$ is 0.24% or more and 0.30% or less, $\Delta 2$ is −0.27% or more and −0.08% or less, $(\Delta 1 - \Delta 2)$ is 0.36% or more and 0.57% or less, b/a is 2 or larger where a core diameter of the core portion is 2a and an outer diameter of the side core layer is 2b, the optical fiber has an effective core area of 107 μm² and larger and 130 μm² or smaller, at a wavelength of 1550 nm, b/a is 4 or smaller, and the cable cutoff wavelength is 1460 nm or shorter.

2. The optical fiber according to claim 1, wherein the optical fiber has a bending loss of 1 dB/m or smaller at the wavelength of 1550 nm upon bending of the optical fiber at a diameter of 30 mm.

3. The optical fiber according to claim 2, wherein the bending loss is 0.5 dB/m or smaller.

4. The optical fiber according to claim 2, wherein the cable cutoff wavelength is 1386 nm or longer.

5. The optical fiber according to claim 1, wherein $\Delta Clad$ is less than 0%.

6. The optical fiber according to claim 1, wherein the core portion includes a dopant that increases a refractive index of a material that the core portion is made of.

7. The optical fiber according to claim 1, wherein $(\Delta 1 + \Delta Clad)$ is 0.03% or more and 0.18% or less.

* * * * *